128/660

United States Patent [19]

Hundt et al.

[11] 4,407,163

[45] Oct. 4, 1983

[54] METHOD FOR PROCESSING ULTRASONIC ECHO SIGNALS OF BOTH DIRECTIONALLY REFLECTING AS WELL AS NON-DIRECTIONALLY SCATTERING OBJECTS, PARTICULARLY FOR ULTRASONIC IMAGE PROCESSING IN THE FIELD OF SUBSTANCE OR TISSUE INVESTIGATION

[75] Inventors: Eckart Hundt, Haar; Elmar Trautenberg, Fuerth, both of Fed. Rep. of Germany

[73] Assignee: Siemens Aktiengesellschaft, Berlin & Munich, Fed. Rep. of Germany

[21] Appl. No.: 264,130

[22] Filed: May 15, 1981

[30] Foreign Application Priority Data

May 21, 1980 [DE] Fed. Rep. of Germany ....... 3019436

[51] Int. Cl.³ ............................................. G01N 29/00
[52] U.S. Cl. ....................................... 73/607; 128/660
[58] Field of Search ................. 73/602, 606, 607, 609, 73/620; 367/7, 11; 128/660

[56] References Cited

U.S. PATENT DOCUMENTS 4,021,771  5/1977  Collins et al. .......................... 367/11
4,106,346  8/1978  Matzuk ................................. 128/660
4,322,974  4/1982  Abele et al. .......................... 128/660

Primary Examiner—Stephen A. Kreitman
Attorney, Agent, or Firm—Hill, Van Santen, Steadman & Simpson

[57] ABSTRACT

In an exemplary embodiment, the processing techniques of computerized x-ray tomography are applied to improve resolution transverse to the depth direction, for example with the use of compound ultrasonic scanning. In this way, an improved preliminary image for representing non-directionally scattering image points is attained. The ultrasonic echo signals are also processed to provide a preliminary image based predominantly or exclusively on directionally reflecting image points. The respective preliminary images for each image point or point region are then suitably combined to provide a stored ultrasonic image capable of display of the scanned region of improved accuracy, resolution, and freedom from noise.

17 Claims, 3 Drawing Figures

METHOD FOR PROCESSING ULTRASONIC ECHO SIGNALS OF BOTH DIRECTIONALLY REFLECTING AS WELL AS NON-DIRECTIONALLY SCATTERING OBJECTS, PARTICULARLY FOR ULTRASONIC IMAGE PROCESSING IN THE FIELD OF SUBSTANCE OR TISSUE INVESTIGATION

BACKGROUND OF THE INVENTION

The present invention relates to a method for processing ultrasonic echo signals of both directionally reflecting as well as non-directionally scattering objects, particularly for ultrasonic image processing in the field of substance or tissue investigation in which ultrasonic echo signals are combined proceeding from various scanning directions. Known methods for processing ultrasonic echo signals cannot process signals proceeding from exactly reflecting and isotropically scattering object ranges with equal quality. Areas with a highly directional reflection, such as, for example, organ contours or cranium bones of an embryo, are imaged well in the known "B-scan method" insofar as they are oriented in such manner that the reflected echoes strike the receiver. In contrast thereto, centers which scatter isotropically are only weakly reproduced and blurred in the "B-scan method" and can therefore be covered in the image by other image elements. The B-scan image of ultrasonic imaging known from previously known employments has further deficiencies in addition to the above disadvantages. Thus, among other things, the resolution of such ultrasonic images at right angles to the irradiation direction is significantly poorer than in the irradiation direction. Moreover, signals form individual scattering centers are suppressed in comparison to the stronger reflection signals of surfaces.

These deficiencies are partially overcome in that B-scan images from a plurality of directions are superimposed according to the known compound-scan method. Therewith, reflecting surfaces can be generally imaged rather well. The resolution given punctiform scattering centers, however, is worsened. Due to the blurring of the point image at right angles to the direction of irradiation and due to the superimposition, punctiform scattering centers are blurred in a star shape.

In the known method of "x-ray computer tomography," every point is expanded or, respectively, spread into a strip. The strips gained in such manner are filtered and superimposed in accord with a method designated below as a "spread image method."

In contrast to B-mode scanning, this spread image method of x-ray computer tomography reproduces object parts with a locally isotropic scatter behavior very well. Significant image errors, however, occur given greatly anisotropic, i.e., exactly reflecting surfaces. The attempt to transfer the spread image method to objects with precisely reflecting boundaries must fail. This becomes understandable when one considers that, given this method, strips with respectively equal echo transit times are superimposed from different irradiation directions. An isotropically scattering center contributes with equal strength to each strip proceeding through it and is therefore reproduced at its location in the superimposition. A point with a precisely reflecting environment, however, contributes to only one strip. This is orthogonal to the respective reflection direction. It contributes nothing to the other strips passing through said point. In the superimposition, therefore, it is practically suppressed. Standard convolution for filtering of the image gained from the superimposition of said strips has an additional negative influence on the result in the case of exact reflection. This convolution is only correct given "isotropic" superimposition. Missing image amounts give rise to disruptions. Extensive investigations in the area of ultrasonic echo image generation concerning the reflection and scatter behavior in biological agents have shown that both isotropic scatter behavior as well as exact reflection and their mixed forms play a significant role.

SUMMARY OF THE INVENTION

The object of the present invention is to contribute a method for processing ultrasonic echo signals from both directionally reflecting as well as non-directionally scattering objects which is particularly suitable for ultrasonic image processing in the area of substance and tissue investigation. According to the object of the invention, the images generated should be largely free of image blurrings and disruptive or, respectively, falsifying image elements. The present invention proceeds from the perception that the object as erected can be achieved by means of the combination of superimposed B-scan images or, respectively, parts thereof and a so-called strip image corrected by means of a convolution integral. The invention further proceeds from the perception that the complicated and extensive calculations required for this can be executed with the means of available hardware and the available knowledge for the development of a suitable software from computer technology.

The object underlying the present invention is achieved by means of a method for processing ultrasonic echo signals of both directionally reflecting as well as non-directionally scattering objects, particularly for ultrasonic image processing in the field of substance or tissue investigation, in which ultrasonic echo signals are combined from various scanning directions, said method being characterized in that the linkage (coupling or combining) of preliminary images which are gained by means of the evaluation of the signals proceeding from directional reflection or non-directional scattering of ultrasonic scanning pulses is provided for producing an image. The inventive method renders possible an advantageous ultrasonic imaging by means of which reflecting surfaces and scattering centers can be simultaneously imaged with improved image quality. Thereby, surfaces are advantageously completely imaged. The resolution at right angles to the irradiation direction is improved. Moreover, the method offers the advantage that the image of scattering centers and the image of the reflecting surfaces can be processed separately and with differing corrections (for example, of physical noise effects or for the purpose of image improvement). Further developments of the present invention are characterized by the features cited in the subclaims. In the following, embodiments of the present invention are described on the basis of several Figures on the accompanying drawing sheet.

DESCRIPTION OF THE PREFERRED EMBODIMENTS

Figure 1:
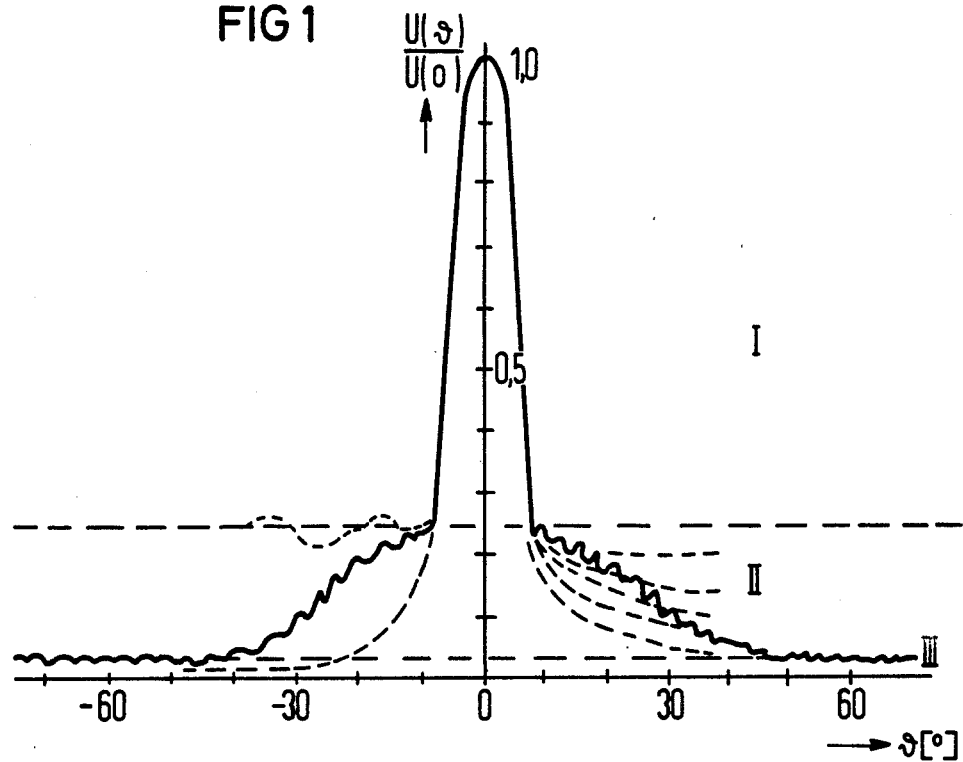
FIG. 1 schematically shows a plot of the reflection and scatter characteristics in various types of biological tissue given assumed echo operation (transmitter = receiver)

As already explained, FIG. 1 schematically shows a graphical representation of the reflection and scatter characteristics in various biological tissue types given assumed echo operation (using a common transducer as transmitter and receiver), wherein the ratio of echo signal amplitude (as a function of angle of incidence), $U(\theta)$, to the signal consisting of total reflection given perpendicular irradiation, $U(0)$, is plotted as a function of the angle of incidence $\theta$. The ordinate is divided into three amplitude ranges (which are separated by horizontal dash lines), namely, a range I which is only attained by signals proceeding from exact reflection, a range II which is generally occupied by signals proceeding from diffuse reflection, and a range III which is exclusively occupied by signals proceeding from isotropic scattering. FIG. 1 shows curves obtained from measured results which were achieved in measurements of various biological tissue types, such as liver tissue or, respectively, muscle tissue and ground tissue, for example, sausage. The curve areas with broken lines represent mean values or idealized values. As can be seen, the reflection behavior, even given precisely reflecting tissue, is also characterized by diffuse reflection or, respectively, even by isotropic scattering as a function of the angle of incidence of the ultrasonic pulses. FIG. 1 clearly shows that exact reflection plays a determining role in addition to an isotropic scattering behavior.

Figure 2:
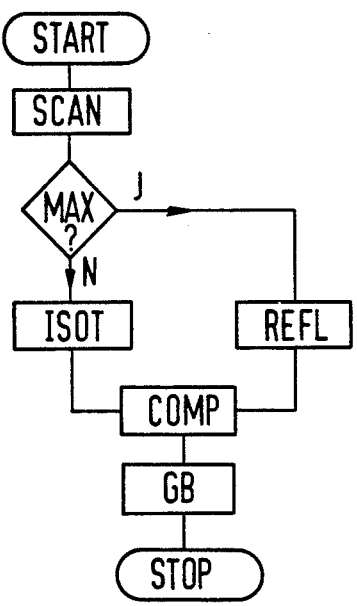
FIG. 2 schematically shows a flow chart for the method steps to be inventively executed according to a first exemplary embodiment of the invention.

As already explained, FIG. 2 schematically shows a flow chart for the method steps to be inventively executed according to a first exemplary embodiment of the invention. According to this embodiment, ultrasonic echo signal imagings from various scanning directions are made of the object to be investigated as represented by the procedural step labeled "SCAN" in FIG. 2. Subsequently, the maximum of the signal intensity is sought for each object point from the partial images gained from the various scanning directions. For that case in which a significant maximum(designated "MAX"in FIG. 2), has been found for an object point, the image point representing said object point is further processed for producing the image as a signal generated by means of an echo signal from a reflecting object surface. All remaining echo signals are further processed for producing the image as signals generated by means of non-directionally scattering object areas.

Figure 3:
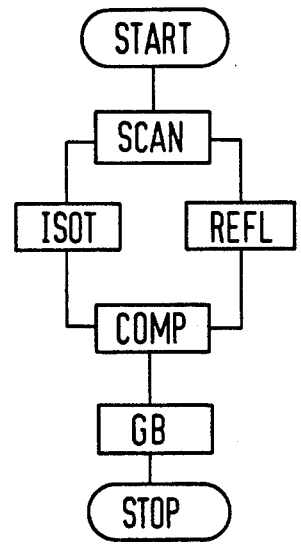
FIG. 3 schematically shows a flow chart for the method steps to be inventively executed according to a second exemplary embodiment of the invention.

In FIG. 2, a decision lozenge "MAX?" is provided to represent the processing of the ultrasonic echo signals to test for a significant maximum for each object point, the one output "J" (affirmative decision) of said lozenge leading to the processing steps for the reflected signals to form a preliminary image (designated "REFL") and the other output "N" (negative decision), leading to the processing of isotropically scattered signals into a preliminary image (designated "ISOT"). The decision as to whether echo signals are to be evaluated as reflected signals or as non-directionally scattered signals is undertaken by means of a difference boundary to be respectively determined. The difference boundaries can be continuously adjusted by means of suitable, selectable difference thresholds. For the decision between reflection and scattering signals, it is not only a respective object point but, rather, its immediate environment as well which is to be taken into consideration. The shape of said environment and the difference threshold determined according to the signal intensities of the environment. Expediently, individual image areas are processed separately and respectively adapted to the "isotropy" of the signals. The preliminary image gained from the echo signals of the reflecting object points is produced according to the invention according to a B-scan method known per se. According to a further development of the invention, the preliminary image gained from the echo signals of reflecting object points is to be produced according to a compound-scan method known per se or, alternately, by means of a sector-scan method. The reflection signals perceived in the decision "MAX?" are combined into the preliminary image "REFL" of the reflecting image parts. In producing the preliminary image of reflecting object areas, signals proceeding from scattering object areas are suppressed in order to exclude disruptive or falsifying image elements. According to FIG. 2, the preliminary image gained from the echo signals of scattering object areas is produced in a second branch of the method cycle according to a tomography (back projection) method known per se from x-ray examination methods. According to a further development of the invention, the preliminary image gained in such manner is corrected by means of a filtered back projection known per se. In producing the preliminary image, echo signals which exceed a selectable maximum value are suppressed in order to avoid image blurrings. FIG. 2 shows that the preliminary images gained in the different manners are subsequently linked (coupled or combined) to form an overall image "GB". This linkage inventively ensues by means of additive superimposition as represented by the block "COMP" in FIG. 2, of electrical signals, namely discrete binary digital signals, (sets of logical ones and logical zeroes), representing image points which correspond location-wise. According to a further development of the inventive method, the linkage can be undertaken by means of multiplicative superimposition. It can also be expedient to undertake the linkage by means of indirect or direct mixed additive/multiplicative superimposition. The linkage process represented at "COMP" in FIG. 2, is expediently executed as a function of the respective image structure with different weight assigned to individual image areas. According to another further development of the invention, it is not only the respective object points but, rather, their environment as well which is taken into consideration for the linkage of the respective preliminary images and the respective weighting factor for the linkage is determined according to the signal intensities of the appertaining environment. As already explained, FIG. 3 schematically shows a flow chart for the method steps to be inventively executed according to a second exemplary embodiment of the invention. According to this embodiment, ultrasonic echo signal imagings from various scanning directions (the step "SCAN" in FIG. 3) are first undertaken of the object to be investigated. This occurs according to the known B-scan method or, alternately thereto, according to the likewise known sector-scan or compound-scan methods. Since the reflected signals are more greatly emphasized in said images, they can be processed into the preliminary image (as represented by block "REFL" in FIG. 3) directly, namely, without further differentiation or evaluation according to maximum signals. The same measured signals are processed according to the previously mentioned spread image method. Thereby, as already mentioned, the isotropically scattering image components are emphasized as represented by the block "ISOT," FIG. 3 to obtain the corresponding preliminary image.

All remaining operations or, respectively, method steps proceed as in the method according to FIG. 2.

Although modifications and changes may be suggested by those skilled in the art it is the intention of the inventors to embody within the patent warranted hereon all changes and modifications as reasonably and properly come within the scope of their contribution to the art.

In the embodiments of FIGS. 2 and 3, the processing techniques of computerized x-ray tomography (e.g. as described in Section 2.2 "Integral Transformation Techniques," in Siemens Forsch. -u. Entwickl. -Ber., Vol. 7, 1978, No. 4, "Principles of Image Reconstruction in x-ray Computer Tomography") are applied to the ultrasonic echo signals (from step "MAX," FIG. 2 or "SCAN," FIG. 3) so as to provide a preliminary image of the scanned region (block "ISOT," FIGS. 2 and 3) responsive to non-directionally scattering image points.

For example, by B mode scanning the preliminary image of non-directionally scattering image points may include a set of image points defining a line transverse to the depth direction, but with relatively poor resolution in this transverse direction. With compound scanning, the effect of a fan-shaped beam moving transversely to the depth direction is obtained, and the processes of convolution, interpolation and back projection improve transverse resolution. The ultrasonic echo signals are also processed to provide a preliminary image based on directionally reflecting image points (at block "REFL"). The respective processed signals for each image point or point region are then suitable combined to provide a stored ultrasonic image for providing a display of the scanned region of improved accuracy, resolution and freedom from noise.

We claim as our invention:

1. A method for processing ultrasonic echo signals of directionally reflecting as well as non-directionally scattering objects, particularly for ultrasonic image processing in the field of substance and tissue examination, said method comprising: combining ultrasonic echo signals from various scanning directions, and being characterized by the steps of evaluating the signals proceeding from directional reflection and from non-directional scattering of ultrasonic scanning pulses to produce respective preliminary images in accordance therewith, and producing a resultant image by coupling of the respective preliminary images, the evaluating step being characterized in that the maximum of the signal intensity is sought for each object point from the partial images gained from various scanning directions; in that, in that case in which a significant maximum is found for an object point, the image point representing said object point is further processed for producing a preliminary image as a signal generated by an echo signal of a reflecting object surface; and in that all remaining echo signals are processed for producing a preliminary image as signals generated by non-directionally scattering object areas.

2. A method according to claim 1, characterized in that the coupling of the respective preliminary images is effected by means of additive superimposition.

3. A method according to claim 1, characterized in that the coupling is effected by means of multiplicative superimposition.

4. A method according to claim 1, characterized in that the coupling is effected by means of mixed additive/multiplicative superimposition.

5. A method according to claim 1, characterized in that the coupling is executed as a function of the image structure of the respective preliminary images with differing weighting of individual image areas.

6. A method according to claim 5, characterized in that it is not only the respective object point but, rather, its environment as well which is taken into consideration for the coupling of the respective preliminary images, and the weighting factor is determined according to the signal intensitiies of the environment.

7. A method according to claim 1, characterized in that the difference boundaries between non-directionally scattered and reflected signals are continuously adjustable by means of suitable, selectable difference thresholds.

8. A method according to claim 1, characterized in that it is not only one object point but, rather, its immediate environment as well which is taken into consideration for the decision between reflection and scatter signals; and in that the shape of said environment and the difference threshold are determined according to the signal intensities of the environment.

9. A method according to claim 8, characterized in that the individual image areas are separately processed and respectively adapted to the "isotropy" of the signals.

10. A method according to claim 1, characterized in that the preliminary image gained from echo signals of reflecting object points is produced according to a B-scan method.

11. A method according to claim 1, characterized in that the preliminary image gained from the echo signals of reflecting object points is produced according to a compound-scan method.

12. A method according to claim 1, characterized in that the preliminary image gained from the echo signals of reflecting object points is gained according to a sector-scan method.

13. A method according to claim 1, characterized in that the signals from scattering object areas are suppressed in the production of the preliminary image of reflecting object areas in order to exclude disruptive or falsifying image elements.

14. A method according to claim 1, characterized in that the preliminary image gained from echo signals of scattering object areas is produced according to a tomography (back projection) method.

15. A method according to claim 1, characterized in that the preliminary image gained from echo signals of scattering object areas is corrected by means of filtered back projection.

16. A method according to claim 1, characterized in that echo signals which exceed a selectable maximum value are suppressed in the production of the preliminary image of scattering objects in order to avoid image blurrings.

17. A method according to claim 1, characterized in that the individual method steps are computer-controlled.

* * * * *